(12) United States Patent　　(10) Patent No.: US 7,125,048 B2
Davis, Jr. et al.　　(45) Date of Patent: Oct. 24, 2006

(54) DAMPENER

(75) Inventors: Joseph J. Davis, Jr., Ortonville, MI (US); Sarkis B. Mikhjian, Rochester Hills, MI (US); Wael Youssef-Agha, Rochester Hills, MI (US); Michael J. Hier, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 71 days.

(21) Appl. No.: 10/288,849

(22) Filed: Nov. 6, 2002

(65) Prior Publication Data

US 2004/0084888 A1　　May 6, 2004

(51) Int. Cl.
*B62D 1/16*　　(2006.01)
*F16F 7/10*　　(2006.01)
(52) U.S. Cl. .................. 280/780; 188/379; 267/140.12
(58) Field of Classification Search .............. 280/779, 280/780; 188/378, 379, 380; 267/140.12, 267/293
See application file for complete search history.

(56) References Cited

U.S. PATENT DOCUMENTS

| | | | |
|---|---|---|---|
| 1,483,903 A * | 2/1924 | Masury | 280/780 |
| 3,214,994 A * | 11/1965 | Tolan, Jr. | 74/490 |
| 3,843,188 A * | 10/1974 | Kirschner | 295/7 |
| 4,413,702 A | 11/1983 | Schlanger | |
| 4,416,446 A | 11/1983 | Murakami | |
| 4,946,194 A | 8/1990 | Maeda et al. | |
| 5,390,955 A | 2/1995 | Kaliszewski et al. | |
| 5,503,496 A | 4/1996 | Voigt | |
| 5,605,351 A | 2/1997 | Higashino | |
| 5,700,032 A | 12/1997 | Fukunaga | |
| 5,704,254 A | 1/1998 | Thomas et al. | |
| 5,845,936 A | 12/1998 | Higashino | |
| 5,884,892 A * | 3/1999 | Gassen et al. | 248/635 |
| 5,941,129 A | 8/1999 | Anspaugh et al. | |
| 5,944,348 A * | 8/1999 | Boyle et al. | 280/777 |
| 6,092,955 A | 7/2000 | Chartrain et al. | |
| 6,139,057 A | 10/2000 | Olgren et al. | |
| 6,148,687 A | 11/2000 | Kurita | |
| 6,354,578 B1 | 3/2002 | Nakatsukasa et al. | |
| 6,371,519 B1 | 4/2002 | Jurik et al. | |
| 6,394,494 B1 | 5/2002 | Jurik et al. | |
| 6,419,214 B1 * | 7/2002 | Palinkas | 267/141 |
| 6,623,365 B1 | 9/2003 | Maretzke et al. | |
| 2001/0019205 A1 | 9/2001 | Ikeda et al. | |
| 2001/0024035 A1 | 9/2001 | Scheib et al. | |
| 2002/0088296 A1 | 7/2002 | Schroter et al. | |

FOREIGN PATENT DOCUMENTS

| | | |
|---|---|---|
| DE | 36 30 870 | 3/1988 |
| DE | 198 21 165 | 11/1999 |
| GB | 2 147 964 | 5/1985 |

OTHER PUBLICATIONS

Document Bibliography and Abstract for DE 198 21 165 from http://v3.espacenet.com/textdoc?DB=EPODOC &IDX=DE19821165&F=0, printed Dec. 1, 2004.

* cited by examiner

*Primary Examiner*—David R. Dunn
(74) *Attorney, Agent, or Firm*—MacMillen, Sobanski & Todd, LLC

(57) ABSTRACT

A vibration dampener for a vehicle to militate against vibration which results in undesirable noise. In an embodiment, the dampener is used in a steering column in the vehicle to militate against the vibration being transmitted to the hands of a driver during operation of the vehicle.

18 Claims, 3 Drawing Sheets

DAMPENER

FIELD OF THE INVENTION

The invention relates to a vibration dampener and more particularly to a vibration dampener for a vehicle instrument panel or steering column, for example, the vibration dampener militating against vibration which results in undesirable noise.

BACKGROUND OF THE INVENTION

In a vehicle, a steering column is typically attached to a cross-car structural beam, either directly or by a steering column support structure. The steering column support structure must support the load of the steering column and other loads associated with vehicle usage and effectively distribute the loads to the cross-car structural beam for distribution to the side walls of the vehicle.

In addition to compensating for the various loads of the steering column, the steering column support structure and the structural beam must account for vibration and the undesirable effects thereof. Typically, additional mass and materials are required to be added to the structural support and structural beam in order to control the occurrence of vibration. However, this results in undesirable weight being added to the vehicle. Additionally, the vibration is transferred to the steering column causing undesirable noise or is transmitted to a driver's hands.

It would be desirable to produce a vibration dampener which militates against vibration and noise in an automobile while minimizing the weight added to a vehicle to control the vibration and the noise.

SUMMARY OF THE INVENTION

Consistent and consonant with the present invention, a vibration dampener which militates against vibration and noise in an automobile while minimizing the weight added to a vehicle to control the vibration and the noise has surprisingly been discovered.

The vibration dampener comprises:

at least one generally disk shaped member having a centrally disposed aperture formed by an inner wall, an outer wall spaced radially from the inner wall with a plurality of radially outwardly extending spokes disposed therebetween, the outer wall adapted to be received by a at least a portion of the structural frame member; and a cylindrical rod adapted to be inserted in the central aperture of the at least one disk shaped member, wherein the cylindrical rod cooperates with the at least one disk shaped member to dampen vibration from the structural frame member.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
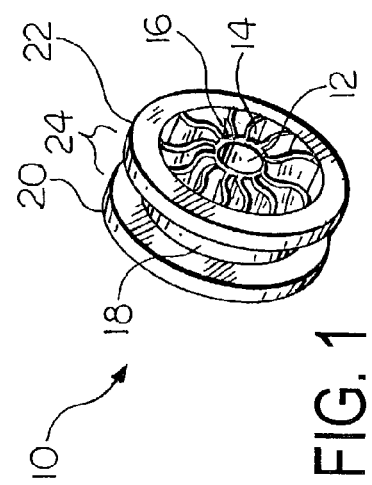
FIG. 1 is a perspective view of a dampener in accordance with the present invention.

Referring now to the drawings, and particularly FIG. 1, there is shown generally at 10 a vibration dampener incorporating the features of the invention. The vibration dampener 10 has a generally disk shape with a centrally disposed aperture 12. A web or plurality of radially outwardly extending spokes 14 extend outwardly from an inner wall 16 which forms the aperture 12. In the embodiment shown, the spokes 14 have a generally S-shaped cross section. It is understood that other spoke shapes or configurations could be used without departing from the scope and spirit of the invention. The spokes 14 terminate at an outer wall 18 of the vibration dampener 10. A pair of spaced apart circumferentially extending walls 20, 22 extend radially outwardly from the outer wall 18 to form an annular channel 24 therebetween. In the embodiment shown, the vibration dampener is produced from an injection molded plastic. However, it is understood that other conventional materials or combinations thereof such as metal and injection molded plastic, for example, could be used without departing from the scope and spirit of the invention.

Figure 2:
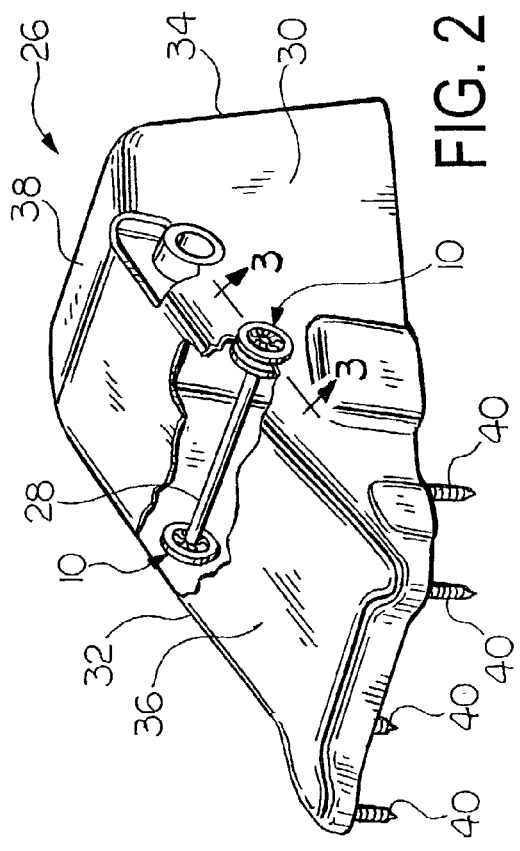
FIG. 2 is a perspective view of a steering column support bracket incorporating the dampener of FIG. 1, a portion of the steering column support bracket is cut away to better illustrate the dampener.

Referring now to FIG. 2, there is shown a hollow steering column support bracket 26 incorporating the dampener 10. A cylindrical rod 28 has a dampener 10 disposed on each end thereof. In the preferred embodiment of the invention, a solid brass or aluminum cylindrical rod 28 is used. However, it is understood that other conventional materials such as steel, ceramic, and the like could be used without departing from the scope and spirit of the invention. Each dampener 10 is correspondingly held in one of a pair of side walls 30, 32 of the support bracket 26. A front wall 34 is disposed between and substantially perpendicular with the side walls 30, 32 and is adapted to be attached to a fire wall (not shown) of an automobile. A sloped rear wall 36 and a top wall 38, complete the support bracket 26. Steering column attachment studs 40 depend from the support bracket 26 to attach a steering column (not shown) thereto.

Figure 3:
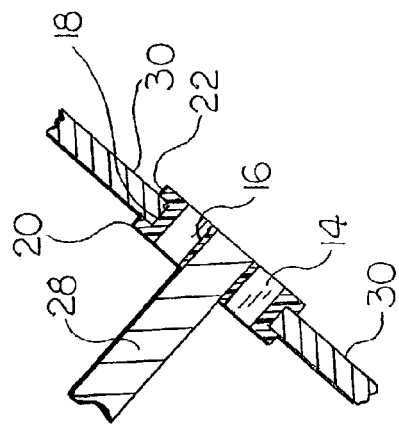
FIG. 3 is an enlarged partial sectional view taken along line 3—3 of FIG. 2 showing the dampener installed in the steering column support bracket.

A sectional view of the vibration dampener 10 installed in the side wall 30 of the support bracket 26 is illustrated in FIG. 3. The dampener 10 is installed in an aperture of the side wall 30 by positioning the side wall 30 in the annular channel 24 with one of each of the walls 20, 22 disposed on opposing sides of the side wall 30. The outer wall 18 of the dampener 10 fits snuggly against a surface forming the aperture of the side wall 30. The dampener 10 in the side wall 32 is similarly installed.

Figure 4:
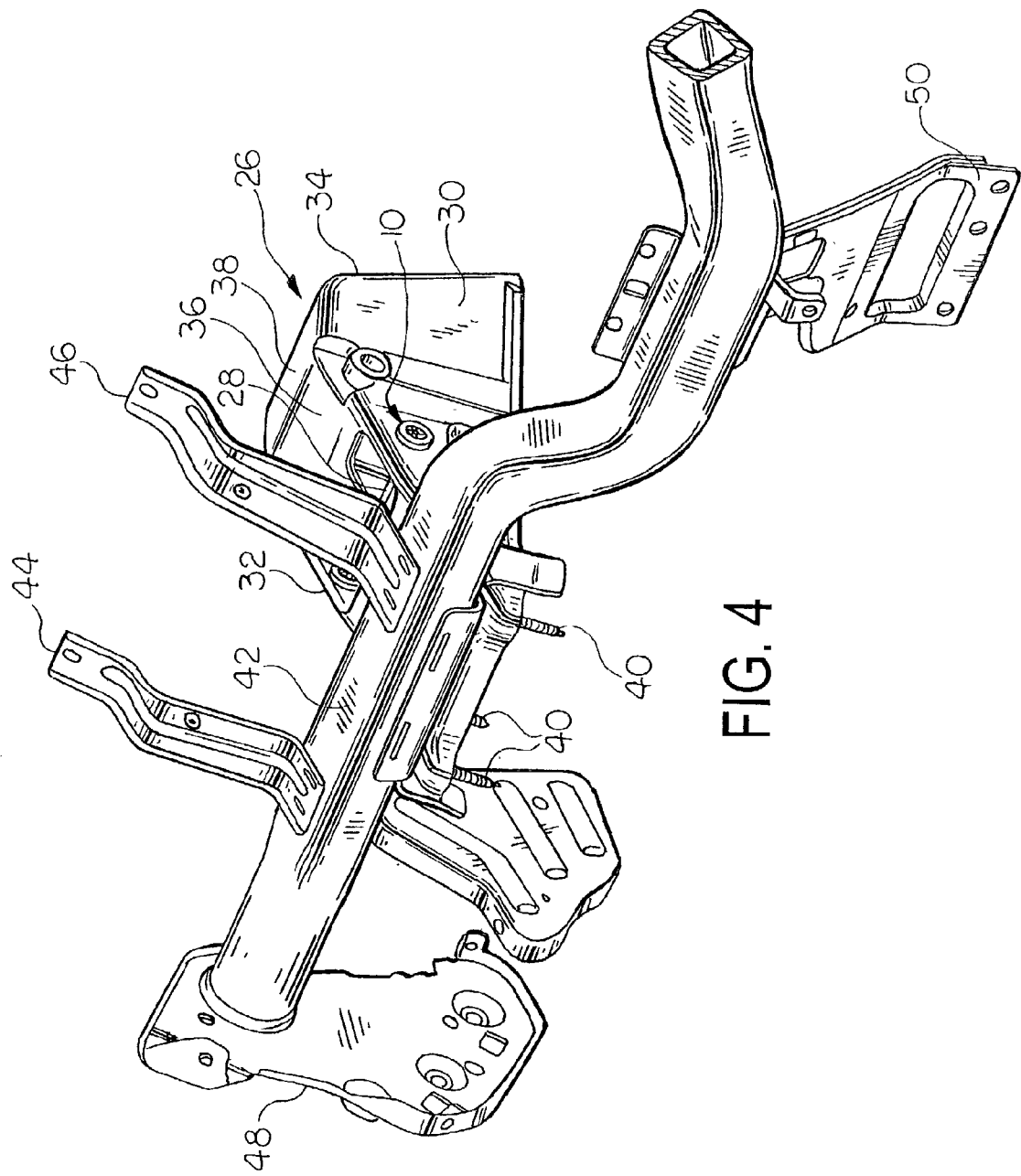
FIG. 4 is a perspective view of a cross car beam assembly including the steering column support bracket illustrated in FIG. 2.
Figure 5:
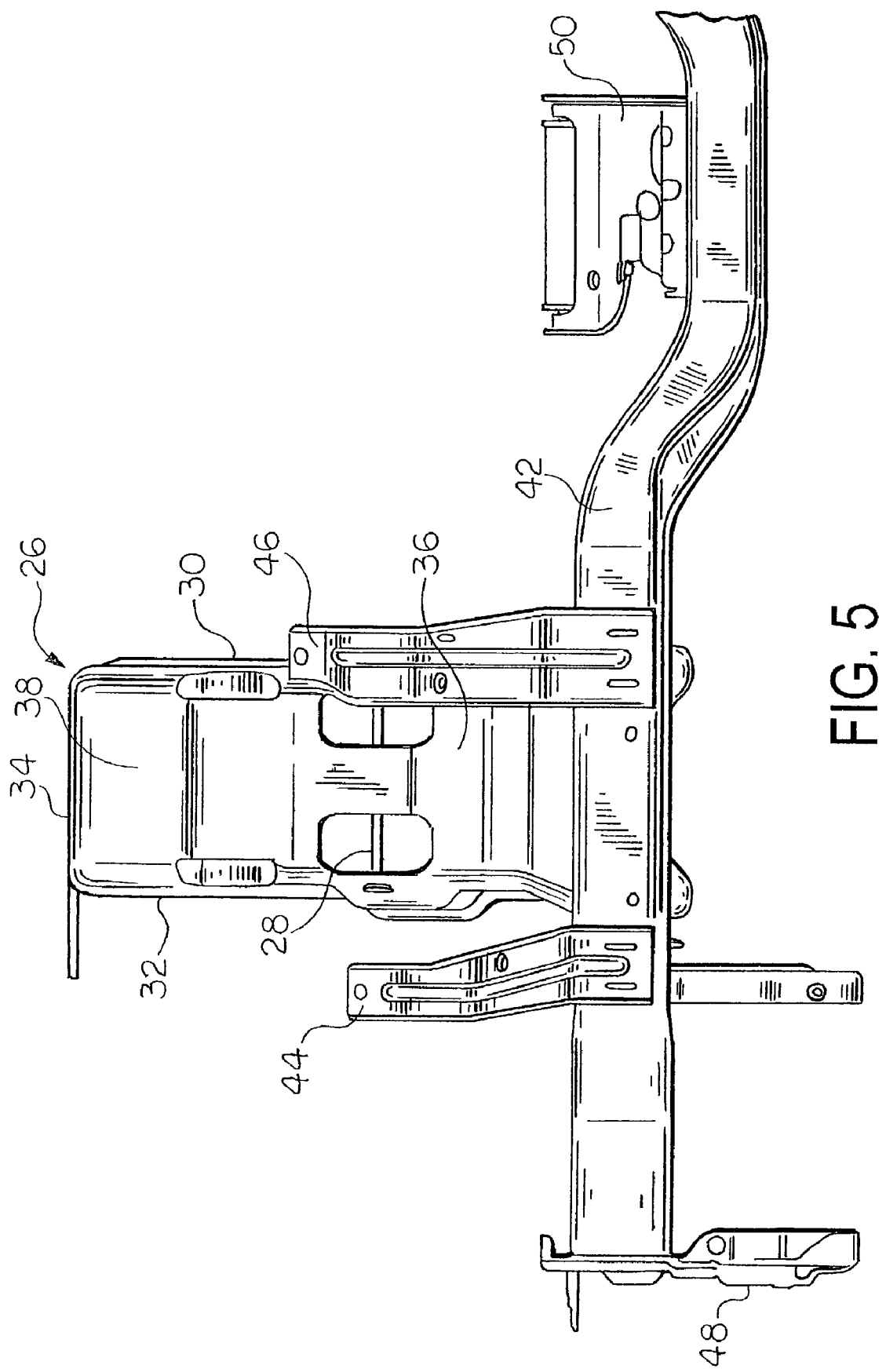
FIG. 5 is a top view of the cross car beam assembly illustrated in FIG. 4.

Referring now to FIGS. 4 and 5, there is shown the support bracket 26 attached to a cross car beam assembly 42. A pair of cross car beam assembly attachment brackets 44, 46 extend upwardly from the cross car beam assembly 42 for attachment to the frame (not shown) of the vehicle. A first side wall attachment bracket 48 is disposed at one end of the cross car beam assembly 42 to attach the cross car beam assembly 42 to a side wall frame (not shown) of the vehicle. A second side wall attachment bracket (not shown) is disposed on the other end of the cross car beam assembly 42.

To further stabilize the cross car beam assembly 42, a mid-section attachment bracket 50 depends therefrom to attach the cross car beam assembly 42 to the fire wall of the vehicle. The cross car beam assembly attachment brackets 44, 46, the first side wall attachment bracket 48, the second side wall attachment bracket, and the mid-section attachment bracket 50 cooperate to substantially rigidly attach the cross car beam assembly 42 to the frame of the vehicle.

In operation, vibrations caused by the vehicle engine, roughness in the road transferred through the suspension system of the vehicle, and the like, are transferred to the steering wheel. These vibrations are ultimately felt by the hands of the driver of the vehicle. As the vibrations move through the vehicle on the way to the steering wheel, they must pass through the support bracket 26. The dampener 10 of the present invention intercepts the vibrations as they pass through the support bracket 26.

As the vibrations begin to pass into the support bracket 26, the support bracket 26 also begins to vibrate. The outer portion of the dampener 10 begins to vibrate with the support bracket 26. The vibration is absorbed in and transferred by the spokes 14 of the dampener 10 to the cylindrical rod 28, thereby causing the cylindrical rod 28 to vibrate. The size and weight of the cylindrical rod 28, and the location within the support bracket 26 of the cylindrical rod 28, are such that the vibration passing into the support bracket 26 is offset by the cylindrical rod 28. Thus, the vibration passing on to the steering column and steering wheel are reduced to a frequency and magnitude such that they are not felt by the driver of the vehicle.

The steering column support bracket 26 must accommodate for reaching a natural frequency and the undesirable effects thereof. The natural frequency is a vibratory level of the vehicle structural system which when reached results in undesired vibration of the steering column and other components within the vehicle.

The steering column support bracket 26, in combination with the cross car beam assembly 42, are typically relied upon in vehicle structural systems to prevent the occurrence of such displacement. This is accomplished by designing the structural support and the cross car beam assembly 42 to increase a first natural frequency beyond a level anticipated to be reached during various vehicle operating modes. Typically, structural supports are added to the cross car beam assembly 42 and other structural members in order to control the occurrence of the first natural frequency, thereby adding additional weight. The dampener 10 of the present invention minimizes the need for those structural supports, thereby operating to minimize the weight of the vehicle.

For the embodiment shown, it is desirable to reduce the natural frequency to as close as possible to 35 hertz. Finite element analysis (FEA) can be used to determine the size, weight, and location of the dampener 10 and the cylindrical rod 28 for a given application to reach the desired frequency. For the embodiment shown, a dampener 10 having a diameter of about 60 mm of the outer wall 18 has been found to be effective.

The dampener 10 operates to make the driving experience more enjoyable and less worrisome to the driver. Since less vibration is passed to and felt by the driver, the driver can focus more on driving and less on what may be causing the vibration in the steering wheel. Noise heard by the driver is also reduced due to the reduction in vibration.

Although the dampener 10 has been described as being used with a steering column support bracket 26 to reduce vibrations transferred to the driver of a vehicle, it is understood that the dampener 10 could be used with other assemblies in an automobile and the like, to reduce vibrations elsewhere. FEA can be used to determine the size, weight, and location of the dampener 10 and the cylindrical rod 28 for a given application.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A vibration dampener for a structural frame member comprising:
    at least one generally disk shaped member having a centrally disposed aperture formed by an inner wall, an outer wall spaced radially from the inner wall with a web disposed therebetween, the outer wall adapted to be received by at least a portion of the structural frame member; and
    a cylindrical rod adapted to be inserted in the central aperture of said at least one disk shaped member, wherein said cylindrical rod cooperates with said at least one disk shaped member to dampen vibration from the structural frame member, wherein the web includes a plurality of radially outwardly extending spokes having a generally S-shaped cross section.

2. The vibration dampener according to claim 1, wherein the outer wall includes a pair of spaced apart circumferentially extending walls forming a channel therebetween, the channel adapted to receive at least a portion of the structural frame member therein.

3. The vibration dampener according to claim 1, wherein said at least one generally disk shaped member is produced from an injection molded plastic.

4. The vibration dampener according to claim 1, wherein said cylindrical rod is produced from brass.

5. A vibration dampener for a vehicle frame member comprising:
    a pair of generally disk shaped members each having a centrally disposed aperture formed by an inner wall, an outer wall spaced radially from the inner wall with a web disposed therebetween, the outer walls adapted to be received by at least a portion of the vehicle frame member, wherein the web includes a plurality of radially outwardly extending spokes; and
    a rod adapted to be inserted in the central apertures of said pair of said disk shaped members, wherein said rod cooperates with said disk shaped members to dampen vibration from the vehicle frame member.

6. The vibration dampener according to claim 5, wherein the spokes of said web have a generally S-shaped cross section.

7. The vibration dampener according to claim 5, wherein the outer wall includes a pair of spaced apart circumferentially extending walls forming a channel therebetween, the channel adapted to receive at least a portion of the vehicle frame member therein.

8. The vibration dampener according to claim 5, wherein said disk shaped members are produced from an injection molded plastic.

9. The vibration dampener according to claim 5, wherein said rod is produced from brass.

10. The vibration dampener according to claim 5, wherein said rod is produced from aluminum.

11. The vibration dampener according to claim 5, wherein said disk shaped members are positioned at ends of said rod.

12. A vibration dampener for a vehicle steering column assembly comprising:

a steering column support bracket adapted to receive a steering column, said steering column support bracket being adapted to be attached to at least one of a cross car beam assembly and a firewall of the vehicle;

a pair of generally disk shaped members each having a centrally disposed aperture formed by an inner wall, an outer wall spaced radially from the inner wall with a web disposed therebetween, the outer walls adapted to be received by at least a portion of said steering column support brackets, wherein the webs include a plurality of radially outwardly extending spokes; and a rod adapted to be inserted in the central apertures of said pair of said disk shaped members, wherein said rod cooperates with said disk shaped members to dampen vibration from the vehicle in said steering column support bracket.

13. The vibration dampener according to claim 12, wherein the spokes of said web have a generally S-shaped cross section.

14. The vibration dampener according to claim 12, wherein the outer wall includes a pair of spaced apart circumferentially extending walls forming a channel therebetween, the channel adapted to receive at least a portion of said steering column support bracket therein.

15. The vibration dampener according to claim 12, wherein said disk shaped members are produced from an injection molded plastic.

16. The vibration dampener according to claim 12, wherein said rod is produced from brass.

17. The vibration dampener according to claim 12, wherein said rod is produced from aluminum.

18. The vibration dampener according to claim 12, wherein said disk shape members are positioned at ends of said rod.

* * * * *